United States Patent
Matsui et al.

(10) Patent No.: US 8,187,744 B2
(45) Date of Patent: May 29, 2012

(54) NON-AQUEOUS ELECTROLYTE AND NON-AQUEOUS ELECTROLYTE SECONDARY BATTERY

(75) Inventors: Tooru Matsui, Osaka (JP); Tetsuo Nanno, Osaka (JP); Hiroshi Yoshizawa, Osaka (JP)

(73) Assignee: Panasonic Corporation, Osaka (JP)

( * ) Notice: Subject to any disclaimer, the term of this patent is extended or adjusted under 35 U.S.C. 154(b) by 436 days.

(21) Appl. No.: 12/489,940

(22) Filed: Jun. 23, 2009

(65) Prior Publication Data
US 2009/0325076 A1 Dec. 31, 2009

(30) Foreign Application Priority Data
Jun. 30, 2008 (JP) .................. 2008-171434

(51) Int. Cl.
*H01M 6/04* (2006.01)
(52) U.S. Cl. ........ 429/199; 429/200; 429/326; 429/188; 429/331; 429/341; 429/231.95; 252/62.2
(58) Field of Classification Search ............. 429/199, 429/200, 326, 188, 331, 341, 231.95; 252/62.2
See application file for complete search history.

(56) References Cited

U.S. PATENT DOCUMENTS

| 7,790,312 B2 * | 9/2010 | Costello et al. ............ 429/200 |
| 2007/0054186 A1 | 3/2007 | Costello et al. |
| 2010/0028784 A1 * | 2/2010 | Pham et al. ................ 429/332 |

FOREIGN PATENT DOCUMENTS
JP 11-026015 1/1999

* cited by examiner

*Primary Examiner* — Laura Weiner
(74) *Attorney, Agent, or Firm* — McDermott Will & Emery LLP (57) ABSTRACT

A non-aqueous electrolyte secondary battery is produced using a non-aqueous electrolyte including: a non-aqueous solvent that primarily contains a solvent mixture of ethylene carbonate and propylene carbonate and includes a fluorine-substituted ether having a divalent group represented by a formula: —$CFX$—$CH(CH_3)$—O—, where X is a hydrogen atom or fluorine atom, in a molecule thereof; and a lithium salt that is dissolved in the non-aqueous solvent. The non-aqueous electrolyte has favorable wettability towards a polyolefin separator, and improves the cycle characteristics and the load characteristics of the non-aqueous electrolyte secondary battery.

7 Claims, 1 Drawing Sheet

NON-AQUEOUS ELECTROLYTE AND NON-AQUEOUS ELECTROLYTE SECONDARY BATTERY

FIELD OF THE INVENTION

The present invention relates to a non-aqueous electrolyte and a non-aqueous electrolyte secondary battery, and more particularly to an improvement in the non-aqueous electrolyte.

BACKGROUND OF THE INVENTION

Developments have conventionally been made on non-aqueous electrolyte secondary batteries, or generally known as lithium ion batteries, that employ a transition metal oxide such as lithium cobalt oxide, lithium nickel oxide, lithium manganese oxide or lithium iron phosphate as a positive electrode active material and a layered carbon compound such as artificial graphite or natural graphite as a negative electrode active material.

Generally, secondary batteries tend to exhibit favorable characteristics in the initial period of use and such characteristics gradually deteriorate owing to the repetition of charge and discharge. Accordingly, non-aqueous electrolyte secondary batteries are required to maintain the same level of characteristics as in the initial period of use over a long period of time and to improve their reliability. Cycle characteristics, load characteristics etc. can be used as an index of the battery reliability. These characteristics are largely affected by side reactions that occur in the interface between the positive electrode and the electrolyte and the interface between the negative electrode and the electrolyte, and by diffusibility of the ions in the non-aqueous electrolyte.

In order to improve the cycle characteristics and load characteristics of a non-aqueous electrolyte secondary battery, for example, the use of a fluorine-substituted ether as a non-aqueous solvent for non-aqueous electrolyte has been proposed. The fluorine-substituted ether is a compound in which all or some of the hydrogen atoms of the ether are substituted by fluorine atoms. By substituting fluorine atoms for hydrogen atoms, the viscosity is reduced, and the electrochemical oxidation resistance is improved. For this reason, fluorine-substituted ethers are considered usable as a non-aqueous solvent for a high energy density secondary battery having an output voltage of around 4 V.

Japanese Laid-Open Patent Publication No. Hei 11-026015 (hereinafter referred to as "Document 1") has proposed a non-aqueous electrolyte that contains a fluorine-substituted ether (hereinafter referred to as "fluorine-substituted ether (A)") represented by General Formula (A): $R_F^1$—$CH_2O$—$R_F^2$, where $R_F^1$ is a linear fluoroalkyl group having at least one fluorine atom and 2, 4, 6 or 8 carbon atoms, and $R_F^2$ is a linear fluoroalkyl group having at least one fluorine atom and 2 or 3 carbon atoms. The fluorine-substituted ether (A) is compatible with a cyclic carbonate such as ethylene carbonate (EC), propylene carbonate (PC) or the like, so by being mixed with such a cyclic carbonate when used, the cycle characteristics and low temperature discharge characteristics of the non-aqueous electrolyte secondary battery can be improved.

However, owing to its low electrochemical reduction resistance, the fluorine-substituted ether (A) is likely to cause a side reaction with a negative electrode active material and take lithium, which is usable in battery reactions, from the negative electrode active material. For this reason, the inclusion of the fluorine-substituted ether (A) in a non-aqueous electrolyte can cause the cycle efficiency of the negative electrode to drop. Consequently, a battery with a sufficient cycle characteristics cannot be obtained.

U.S. Patent Application Publication No. 2007/0054186 (hereinafter referred to as "Document 2") has proposed an electrolyte composition that contains a solvent composition that contains a fluorine-substituted ether (hereinafter referred to as "fluorine-substituted ether (B)") having an oxy (methylmethylene) group [—$CH(CH_3)O$—] in a molecule thereof and an electrolyte salt. As a specific example of the fluorine-substituted ether (B), a compound that has a divalent group represented by a formula: —$CF_2$—$CH(CH_3)$—O— in a molecule thereof is described. Document 2 also discloses that the fluorine-substituted ether (B) has a superior electrochemical oxidation resistance, that even when a battery using the above electrolyte composition is retained at a high voltage, the internal resistance does not increase and is maintained at a low level, and that the use of the above electrolyte composition can improve the cycle characteristics and low temperature load characteristics of the battery.

In addition, Document 2 demonstrates carbonates like EC, PC, diethyl carbonate (DEC) and ethyl methyl carbonate (EMC) as solvents that can be used with the fluorine-substituted ether (B) in the above solvent composition, and describes that the fluorine-substituted ether (B) content in the above solvent composition is, for example, 20 to 90% (see [0071]).

From the viewpoint of avoiding the deterioration of cycle characteristics, load characteristics and the like of the battery, a single-phase non-aqueous electrolyte is required, but the fluorine-substituted ether (B) essentially has poor solubility in carbonates. Thus, in order to obtain a single-phase solvent composition, Document 2 discusses combinations of the fluorine-substituted ether (B) with carbonates, and discloses, as specific examples of such combinations, a combination of the fluorine-substituted ether (B) with EMC or DEC, and a combination of the fluorine-substituted ether (B) with EC and EMC or DEC in the examples thereof.

BRIEF SUMMARY OF THE INVENTION

It is an object of the present invention using a solvent mixture of ethylene carbonate (EC) and propylene carbonate (PC) as a non-aqueous solvent to provide a non-aqueous electrolyte that has superior wettability towards a polyolefin separator and is a favorable medium for charge and discharge reactions, and to provide a non-aqueous electrolyte secondary battery that contains such a non-aqueous electrolyte and exhibits superior cycle characteristics and load characteristics over a long period of time.

A non-aqueous electrolyte of the present invention includes: a non-aqueous solvent that is composed primarily of a solvent mixture of EC and PC and contains fluorine-substituted ether (hereinafter referred to simply as "fluorine-substituted ether (1)") having a divalent group represented by Formula (1): —$CFX$—$CH(CH_3)$—O—, where X is a hydrogen atom or fluorine atom and the same applies hereinafter, in a molecule thereof; and a lithium salt that is dissolved in the non-aqueous solvent.

With the above configuration, the degradation of battery characteristics accompanied by a side reaction between the fluorine-substituted ether (B) and the lithium contained in the negative electrode active material can be suppressed without substantially decreasing the solubility of the lithium salt in the non-aqueous solvent. In addition, the non-aqueous solvent can secure a practically sufficient level of wettability towards a polyolefin separator. Furthermore, with the above configuration, it is possible to obtain a non-aqueous electrolyte secondary battery that maintains the cycle characteristics and load characteristics at a high level over a long period of time.

Among carbonates that are used in a non-aqueous solvent for a non-aqueous electrolyte, EC is a favorable medium for charge and discharge reactions because it is inert to a negative electrode active material such as a carbon material, and is chemically stable in a wide oxidation reduction potential range. EC, however, has a high melting point and is solid at room temperature, so it cannot be used alone as a solvent component. PC has a high dielectric constant and a low melting point, and is chemically stable in a wide oxidation reduction potential range, but interacts with a negative electrode active material such as a carbon material. From the viewpoint of reliability of a non-aqueous electrolyte secondary battery, use of a solvent mixture of EC and PC as a non-aqueous solvent has been proposed, but this is problematic in that the solvent mixture does not wet a polyolefin separator which is most widely used at present. Thus, using a solvent mixture of EC and PC in a non-aqueous electrolyte secondary battery has been an extremely difficult problem. With the above configuration, however, the conventional problem encountered with a non-aqueous electrolyte composed primarily of EC and PC can be solved.

In the present invention, the fluorine-substituted ether (1) content in the non-aqueous solvent is preferably 0.5 to 10 mol %, more preferably, 0.5 to 8 mol %, and even more preferably 1 to 5 mol %.

A non-aqueous electrolyte secondary battery of the present invention includes a positive electrode containing a positive electrode active material, a negative electrode containing a negative electrode active material, and the non-aqueous electrolyte of the present invention.

In the above non-aqueous electrolyte secondary battery, it is preferable that the negative electrode active material contains an element capable of being electrochemically alloyed with lithium, and oxygen.

Because the non-aqueous solvent contained in the non-aqueous electrolyte of the present invention is composed primarily of a solvent mixture of EC and PC, a lithium salt can be readily dissolved and dissociated; thus, the ions can readily spread within and between electrodes, leading to a uniform reaction within the electrode. As a result, the cycle efficiency of the negative electrode can be increased and the charge-discharge cycle characteristics of the battery improves. In addition, a non-aqueous electrolyte secondary battery with superior load characteristics can be obtained.

While the novel features of the invention are set forth particularly in the appended claims, the invention, both as to organization and content, will be better understood and appreciated, along with other objects and features thereof, from the following detailed description taken in conjunction with the drawing.

DETAILED DESCRIPTION OF THE INVENTION

Non-Aqueous Electrolyte

A non-aqueous electrolyte of the present invention contains a non-aqueous solvent and a lithium salt.

The non-aqueous solvent contains EC, PC, and the above-described fluorine-substituted ether (1).

EC and PC are cyclic carbonates conventionally used for non-aqueous electrolytes. The total amount of EC and PC relative to the whole amount of the non-aqueous solvent is 90 to 99.5 mol %, and preferably 95 to 99 mol %.

There is no particular limitation on each of the EC content and the PC content, and appropriate amounts of EC and PC can be selected so as to obtain a single-phase solvent mixture of EC, PC and the fluorine-substituted ether (1).

Preferably, for example, the EC content in the total amount of EC and PC is 30 to 75 mol %, more preferably 50 to 75 mol %, and the remaining is PC content. When the EC content is significantly less than 30 mol %, the effect of suppressing the reaction between the PC and the negative electrode active material may be insufficient. When, on the other hand, the EC content is significantly greater than 75 mol %, a single-phase non-aqueous electrolyte may not be obtained.

The EC content in the non-aqueous solvent is set so as to be, for example, equal to or higher than the PC content. In this case, the effect of EC in suppressing the reaction between PC and the negative electrode active material is exhibited, and the degradation of battery characteristics accompanied by a reaction between PC and the negative electrode active material is prevented. In addition, in this case, the viscosity of the electrolyte tends to decrease, and the diffusibility of lithium ions in the electrolyte improves.

It is also possible to set the EC content in the non-aqueous solvent to be lower than the PC content. In this case, solidification of the non-aqueous solvent in a low temperature environment can be suppressed. Accordingly, a non-aqueous electrolyte suitably applied to a non-aqueous electrolyte secondary battery operating in a low temperature environment can be obtained.

Fluorine-substituted ether (1) has, in a molecule thereof, a divalent group represented by Formula (1): —CFX—CH(CH$_3$)—O— (hereinafter, this divalent group is referred to simply as a "divalent group (1)").

Also, the fluorine-substituted ether (1) preferably has one oxygen atom in a molecule thereof.

The fluorine-substituted ether (1) has superior characteristics as described below, and is effective in improving various characteristics of the battery.

With the fluorine-substituted ether (1), the wettability of the solvent mixture of EC and PC towards a polyolefin separator can be improved significantly. Accordingly, a non-aqueous solvent composed primarily of the solvent mixture of EC and PC can be used in a non-aqueous electrolyte secondary battery that includes a separator made of a polyolefin such as polyethylene or polypropylene. Because EC and PC dissolve a lithium salt and facilitate the dissociation of the lithium salt, the ions can readily spread within and between the electrodes, with a result of a uniform electrode reaction. Consequently, a non-aqueous electrolyte secondary battery with superior load characteristics can be obtained. Furthermore, because a mixture system of EC, PC and the fluorine-substituted ether (1) has favorable wettability towards a polyolefin separator, a sufficient amount of non-aqueous electrolyte is held within the separator, if the separator has a reduced thickness. Specifically, the thickness of a polyolefin separator can be reduced to 10 μm or less. Because the separator can be made thin, the internal resistance of the battery can be suppressed and the load characteristics of the battery improves further.

Also, it is assumed that the fluorine-substituted ether (1) forms, on the negative electrode surface, a film that has a favorable lithium ion permeability and is chemically and electrochemically stable. For example, the fluorine atoms contained in the fluorine-substituted ether (1) gradually react with the lithium in the negative electrode active material, forming a film on the negative electrode surface. Because the fluorine-substituted ether (1) has a divalent group (1) in a molecule thereof, and the carbon atom adjacent to the oxygen atom of the ether has a methyl group, a vinyl ether group, such as —CX=C(CH$_3$)—O—, is easily produced. For this reason, a stable film is readily formed on the negative electrode surface, and this film can suppress a side reaction between the lithium contained in the negative electrode active material and another electrolyte component such as PC.

Furthermore, the fluorine-substituted ether (1) that contains one oxygen atom in a molecule thereof is chemically stable towards a lithium salt such as LiPF$_6$. Accordingly, it is unlikely to react with the lithium contained in the negative electrode active material and to produce an impurity that renders the lithium inactive to charge and discharge reactions. Having such characteristics, the fluorine-substituted ether (1) can significantly improve the cycle characteristics of the battery.

As mentioned above, the fluorine-substituted ether (1) has a methyl group in a molecule thereof, and is assumed to form a stable film on the negative electrode surface. Accordingly, the fluorine-substituted ether (1) has a larger effect of improving the battery's cycle characteristics as compared to a fluorine-substituted ether having a divalent group represented by a formula: —CFX—CH$_2$—O—, where X is the same as described above, in a molecule thereof.

Specific examples of the fluorine-substituted ether (1) include CF$_3$CFHCF$_2$CH(CH$_3$)OCF$_2$CFHCF$_3$, CF$_3$CFHCF$_2$CH (CH$_3$) OCF$_2$CFHC$_3$F$_7$, CF$_3$CFHCF$_2$CH (CH$_3$) OCF$_2$CF$_2$H, CF$_2$HCF$_2$CH(CH$_3$)OCF$_2$CFHCF$_3$, and the like. Among them, CF$_3$CFHCF$_2$CH(CH$_3$)OCF$_2$CFHCF$_3$ is preferred. The fluorine-substituted ether (1) can be used alone or in a combination of two or more.

The fluorine-substituted ether (1) content in the non-aqueous solvent is preferably 0.5 to 10 mol %, more preferably 0.5 to 8 mol %, and even more preferably 1 to 5 mol %. With such an amount, the fluorine-substituted ether of the present invention can exhibit a sufficient effect, and a non-aqueous electrolyte secondary battery with particularly superior cycle characteristics and load characteristics can be obtained. When the amount is less than 0.5 mol %, the wettability towards a polyolefin separator of the non-aqueous electrolyte of the present invention cannot be improved sufficiently, and the resulting non-aqueous electrolyte secondary battery may not work. When the amount exceeds 10 mol %, the solvent mixture of EC, PC and the fluorine-substituted ether (1) will not be a single phase, and the load characteristics and the like of the resulting non-aqueous electrolyte secondary battery may not be improved sufficiently.

The non-aqueous electrolyte of the present invention may contain a non-aqueous solvent other than EC, PC and the fluorine-substituted ether (1) as long as the effects thereof are not impaired. Preferred examples of such a non-aqueous solvent include cyclic carbonates except for EC and PC, cyclic carbonates having a C=C unsaturated bond, cyclic esters, cyclic esters having a C=C unsaturated bond, chain carbonates having a C=C unsaturated bond, chain esters, and the like.

Examples of cyclic carbonates other than EC and PC include butylene carbonate, fluoroethylene carbonate, and the like. Examples of cyclic carbonates having a C=C unsaturated bond include vinylene carbonate, vinylethylene carbonate, divinyl ethylene carbonate, phenyl ethylene carbonate, diphenyl ethylene carbonate, and the like. Examples of cyclic esters include γ-butyrolactone, α-methyl-γ-butyrolactone, γ-valerolactone, and the like.

Examples of cyclic esters having a C=C unsaturated bond include furanone, 3-methyl-2(5H)-furanone, α-angelica lactone, and the like. Examples of chain carbonates having a C=C unsaturated bond include methyl vinyl carbonate, ethyl vinyl carbonate, divinyl carbonate, allyl methyl carbonate, allyl ethyl carbonate, diallyl carbonate, allyl phenyl carbonate, diphenyl carbonate, and the like. Examples of chain esters include methyl propionate, methyl butyrate, and the like.

Although some of the above-listed non-aqueous solvents are solid at room temperature, they can be used without any problem as long as a non-aqueous electrolyte can be prepared by selecting an appropriate composition. It would be advisable to avoid chain carbonates, such as dimethyl carbonate, EMC and DEC, because the amount of gas generated while the battery is stored at high temperatures tends to increase. For the purpose of lowering the viscosity of the non-aqueous electrolyte, the above-listed chain esters are preferable. Such non-aqueous solvents are preferably used in an amount such that they do not exist in the non-aqueous electrolyte after the battery has been charged and discharged several times.

As a lithium salt dissolved in the non-aqueous solvent, any lithium salt commonly used in the pertinent art can be used. Specific examples include LiPF$_6$, LiBF$_4$, LiClO$_4$, lithium bis[oxalate(2-)]borate (LiBOB), lithium bis[trifluoromethanesulfonyl]imide, lithium bis[pentafluoroethanesulfonyl]imide, lithium[trifluoromethanesulfonyl][nonafluorobutanesulfonyl]imide, lithium cyclohexafluoropropane-1,3-bis[sulfonyl]imide, lithium trifluoromethyl trifluoroborate, lithium pentafluoroethyl trifluoroborate, lithium heptafluoropropyl trifluoroborate, lithium tris[pentafluoroethyl]trifluorophosphate, and the like. Among them, LiBOB is preferable because even with a small amount, it can act as an additive that forms a film on the negative electrode. These lithium salts can be used alone or in a combination of two or more. The amount of lithium salt dissolved in the non-aqueous solvent is preferably 0.6 to 1.4 mol relative to 1 liter of the non-aqueous solvent.

The non-aqueous electrolyte of the present invention can be prepared by, for example, dissolving a lithium salt in a non-aqueous solvent containing EC, PC and the fluorine-substituted ether (1).

Non-Aqueous Electrolyte Secondary Battery

The non-aqueous electrolyte secondary battery of the present invention can have a structure similar to conventional non-aqueous electrolyte secondary batteries, except that the non-aqueous electrolyte of the present invention is used. The non-aqueous electrolyte secondary battery of the present invention includes, for example, a positive electrode, a negative electrode and a separator.

The positive electrode includes a positive electrode current collector and a positive electrode active material layer. As the positive electrode current collector, a porous or nonporous conductive substrate can be used, but it is preferable to use a porous conductive substrate in terms of non-aqueous electrolyte permeability throughout an electrode assembly made up of a positive electrode, a negative electrode and a separator. Examples of porous conductive substrates include meshes, nets, punched sheets, lath structures, porous sheets, foams, articles made of fibers (non-woven fabric, etc.), and the like. Examples of nonporous conductive substrates include foils, sheets, films, and the like. Examples of materials for conductive substrates include metal materials such as stainless steel, titanium, aluminum and aluminum alloy. The thickness of the conductive substrate is, but is not limited to, approximately 1 to 50 μm.

The positive electrode active material layer contains a positive electrode active material, and optionally a conductive material, a binder and the like, and is formed on one or both surfaces of a positive electrode current collector. As the positive electrode active material, lithium transition metal oxides such as lithium cobalt oxide, lithium nickel oxide, lithium manganese oxide and lithium iron phosphate; conductive polymer compounds such as polyacetylene, polypyrrole and polythiophene; and the like can be used. Carbon materials can also be used as positive electrode active materials, such as activated carbon, carbon black, non-graphitizable carbon, artificial graphite, natural graphite, carbon nanotubes and fullerenes.

The above-listed positive electrode active materials do not exhibit the same behavior during charge and discharge. For example, a carbon material or conductive polymer compound incorporates anions contained in the non-aqueous electrolyte into the inside thereof during charge, and releases the anions therein into the non-aqueous electrolyte during discharge. A lithium transition metal oxide, on the other hand, releases lithium ions therein into the non-aqueous electrolyte during charge, and incorporates the lithium ions of the non-aqueous electrolyte into the inside thereof during discharge.

As the conductive material, any conductive material commonly used in the pertinent art can be used. Examples include: graphites such as natural graphite and artificial graphite; carbon blacks such as acetylene black, ketjen black, channel black, furnace black, lamp black and thermal black; conductive fibers such as carbon fiber and metal fiber; metal powders such as carbon fluoride powder and aluminum powder; conductive whiskers such as zinc oxide whiskers and conductive potassium titanate whiskers; conductive metal oxides such as titanium oxide; organic conductive materials such as phenylene derivatives; and the like. The conductive materials can be used alone or in a combination of two or more.

The binder can be any binder commonly used in the pertinent art. Examples include polyvinylidene fluoride, polytetrafluoroethylene, polyethylene, polypropylene, aramid resin, polyamide, polyimide, polyamide imide, polyacrylonitrile, polyacrylic acid, poly(methyl acrylate), poly(ethyl acrylate), poly(hexyl acrylate), polymethacrylic acid, poly(methyl methacrylate), poly(ethyl methacrylate), poly(hexyl methacrylate), poly(vinyl acetate), poly(vinyl pyrrolidone), polyether, poly(ether sulfone), poly(hexafluoro propylene), styrene butadiene rubber, modified acrylic rubber, carboxymethyl cellulose, and the like.

The positive electrode active material layer can be formed by, for example, applying a slurry of a positive electrode material mixture onto the surface of a positive electrode current collector, drying and rolling it. Although the thickness of the positive electrode active material layer can be determined appropriately according to various conditions, the thickness is preferably approximately 50 to 100 μm.

The slurry of a positive electrode material mixture can be prepared by dispersing a positive electrode active material and optionally a conductive material, a binder and the like in a solvent. As the solvent, dimethylformamide, dimethylacetamide, methylformamide, N-methyl-2-pyrrolidone, dimethylamine, acetone, cyclohexanone and the like can be used.

The negative electrode includes a negative electrode current collector and a negative electrode active material layer.

As the negative electrode current collector, a porous or nonporous conductive substrate can be used, but it is preferable to use a porous conductive substrate in terms of non-aqueous electrolyte permeability throughout an electrode assembly made up of a positive electrode, a negative electrode and a separator. Examples of porous conductive substrates include meshes, nets, punched sheets, lath structures, porous sheets, foam, articles made of fibers (non-woven fabric, etc.), and the like. Examples of nonporous conductive substrates include foils, sheets, films, and the like. Examples of materials for conductive substrates include metal materials such as stainless steel, nickel, copper and copper alloy. The thickness of the conductive substrate is, but is not limited to, approximately 1 to 50 μm.

The negative electrode active material layer contains a negative electrode active material, and optionally a conductive material, a binder and the like, and is formed on one or both surfaces of a negative electrode current collector. Examples of the negative electrode active material include lithium metal, a carbon material, a conductive polymer compound, an alloy-based negative electrode active material, a lithium-containing transition metal oxide, a metal oxide that is decomposed into lithium oxide and a metal through a reaction with lithium, and the like. The alloy-based negative electrode active material refers to a material that stores lithium therein by being alloyed with lithium and is capable of reversibly absorbing and desorbing lithium.

Specific examples of carbon materials include carbon black, non-graphitizable carbon, artificial and natural graphites with the surface covered with an amorphous carbonaceous material, carbon nanotubes, fullerenes and the like. Specific examples of conductive polymer compounds include polyacetylene, polyparaphenylene and the like. Examples of alloy-based negative electrode active materials include a metal capable of being alloyed with lithium, a material containing a metal capable of being alloyed with lithium and oxygen, and the like. Specific examples of metals capable of being alloyed with lithium include Ag, Au, Zn, Al, Ga, In, Si, Ge, Sn, Pb, Bi, and the like. Specific examples of materials containing a metal capable of being alloyed with lithium and oxygen include a Si oxide, a Sn oxide, and the like. Examples of lithium-containing transition metal oxides include $Li_4Ti_5O_{12}$, and the like. Examples of a metal oxide that is decomposed into lithium oxide and a metal through a reaction with lithium include CoO, NiO, MnO, $Fe_2O_3$, and the like.

Among those listed above, it is preferable to use an active material that absorbs lithium ions during charge and desorbs lithium ions during discharge, and more preferably a material containing an element capable of being alloyed with lithium and oxygen, namely, an oxide of Si or Sn, or the like. By using such a negative electrode active material, a lithium oxide film is formed on the negative electrode surface during the initial charge. Then, the reductive decomposition of the fluorine-substituted ether proceeds gradually, and the effect of the fluorine-substituted ether in mending the film is observed over a long period of time. As a result, the cycle characteristics of the non-aqueous electrolyte secondary battery can be further improved.

The negative electrode active material layer can be formed by, for example, applying a slurry of a negative electrode material mixture onto the surface of a negative electrode current collector, drying and rolling it. Although the thickness of the negative electrode active material layer can be determined appropriately according to various conditions, the thickness is preferably approximately 50 to 100 μm. The slurry of a negative electrode material mixture can be prepared by dispersing a negative electrode active material and optionally a conductive material, a binder, a thickener and the like in a solvent. As the conductive material and binder, the same materials as used in preparing the slurry of a positive electrode material mixture can be used. As the solvent, water and the same materials as used in preparing the slurry of a positive electrode material mixture can be used. As the thickener, carboxymethyl cellulose or the like can be used.

In the case of using lithium metal as a negative electrode active material, for example, a thin lithium metal plate is firmly attached to a negative electrode current collector. In the case of using a Si oxide, a Sn oxide or the like as a negative electrode active material, the negative electrode active material layer can be formed by vapor deposition, sputtering or the like.

A separator is interposed between a positive electrode and a negative electrode, and insulates the positive electrode and the negative electrode from each other. As the separator, a sheet or film having a prescribed ion permeability, mechanical strength, insulating property and the like is used. Examples include a porous sheet or film such as a microporous film, a woven fabric, or a non-woven fabric. The microporous film may be either a monolayer film or a multi-layer film (composite film). Where necessary, the separator may be configured by laminating two layers or more, such as a microporous film, a woven fabric, a non-woven fabric, and the like.

The separator can be made of various resin materials. Among resin materials, it is preferable to use a polyolefin such as polyethylene or polypropylene, in terms of durability, shut-down function, battery safety and the like. As used herein, "shut-down function" refers to a function that closes through holes in the event of the battery overheating, thereby suppressing ions from passing through the separator, and shutting down the battery reaction. The thickness of the separator is usually 10 to 300 μm, preferably 10 to 40 μm, and more preferably 10 to 30 μm. The porosity of the separator is preferably 30 to 70%, and more preferably 35 to 60%. As used herein, "porosity" refers to the ratio of the total volume of pores present in a separator to the volume of the separator.

In the non-aqueous electrolyte secondary battery of the present invention, the electrode assembly, which is produced by laminating a positive electrode and a negative electrode with a separator interposed therebetween, may be a laminate design or a spirally wound design. The non-aqueous electrolyte secondary battery of the present invention can take various forms. Examples of battery forms include a prismatic type, a cylindrical type, a coin type, a metal-laminated film type, and the like.

Figure 1:
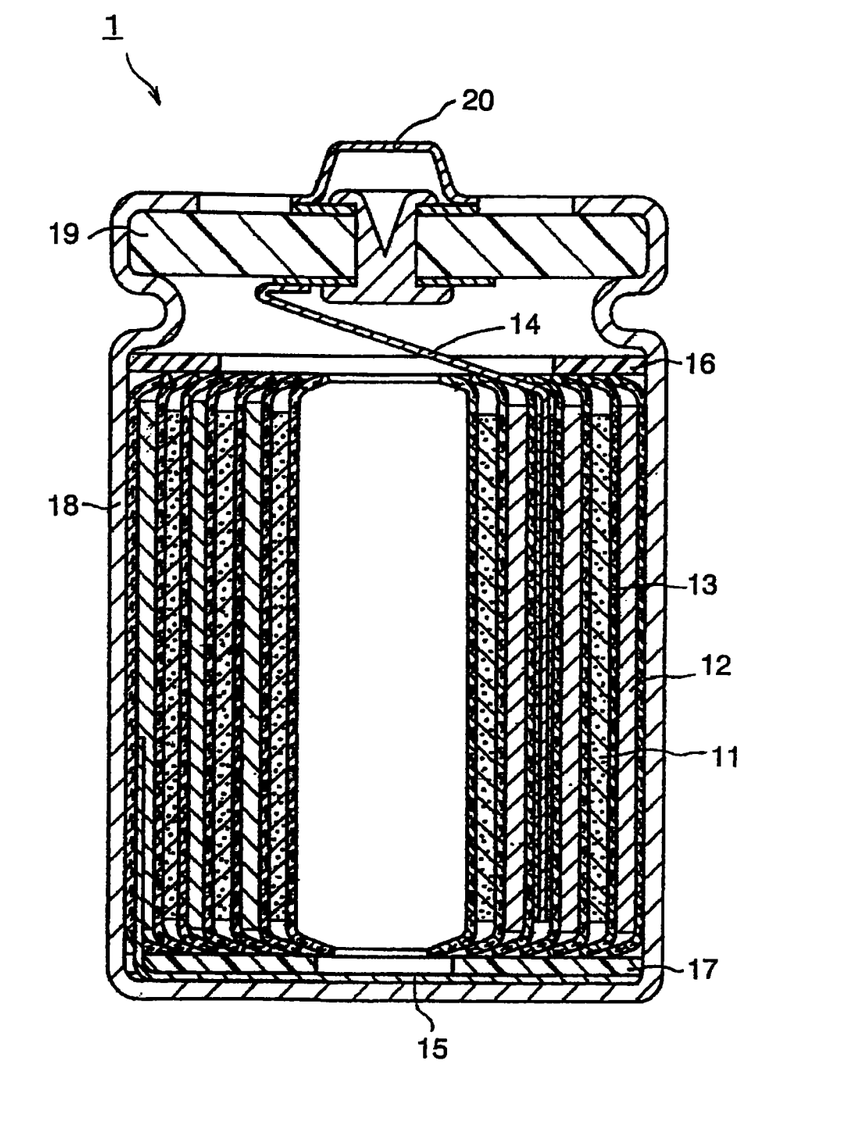
FIG. 1 is a vertical cross-sectional view schematically showing a cylindrical non-aqueous electrolyte secondary battery according to an embodiment of the present invention.

FIG. 1 is a vertical cross-sectional view schematically showing the configuration of a cylindrical non-aqueous electrolyte secondary battery 1 according to an embodiment of the present invention. The non-aqueous electrolyte secondary battery 1 is a cylindrical battery that includes a positive electrode 11, a negative electrode 12, a separator 13, a positive electrode lead 14, a negative electrode lead 15, an upper insulating plate 16, a lower insulating plate 17, a battery case 18, a sealing plate 19, a positive electrode terminal 20, and the non-aqueous electrolyte of the present invention (not shown).

The positive electrode 11, the negative electrode 12 and the separator 13 are laminated in the order of the positive electrode 11, the separator 13 and the negative electrode 12, and then spirally wound to produce an electrode assembly. The positive electrode lead 14 has one end connected to the positive electrode 11 and the other end connected to a connecting portion of the sealing plate 19 that is connected to the positive electrode terminal 20. The positive electrode lead 14 is made of, for example, aluminum. The negative electrode lead 15 has one end connected to the negative electrode 12 and the other end connected to the bottom of the battery case 18 that serves as a negative electrode terminal. The negative electrode lead 15 is made of, for example, nickel.

The battery case 18 is a bottomed cylindrical container member, and functions as a negative electrode terminal with one end in the longitudinal direction being open, and the other end serving as the bottom. The upper insulating plate 16 and the lower insulating plate 17 are resin members, which are respectively placed on both ends in the longitudinal direction of the spirally wound electrode assembly to insulate the spirally wound electrode assembly from other members. The battery case 18 is made of, for example, iron. The inner surface of the battery case 18 is plated with, for example, nickel. The sealing plate 19 is equipped with the positive electrode terminal 20.

The cylindrical non-aqueous electrolyte secondary battery 1 can be produced as follows, for example. First, one end of the positive electrode lead 14 and one end of the negative electrode lead 15 are respectively connected to prescribed positions of the spirally wound electrode assembly, the upper insulating plate 16 and the lower insulating plate 17 are placed respectively on the top and underside of the electrode assembly and, then, the electrode assembly is housed in the battery case 18. The other end of the positive electrode lead 14 is connected to the sealing plate 19. The other end of the negative electrode lead 15 is connected to the bottom of the battery case 18. Subsequently, the non-aqueous electrolyte of the present invention is injected into the battery case 18, and the opening of the battery case 18 is tightly sealed with the sealing plate 19. Thereby, the non-aqueous electrolyte secondary battery 1 is obtained. A resin gasket may be disposed between the battery case 18 and the sealing plate 19.

EXAMPLES

The present invention will be described below in further detail with reference to examples and comparative examples.

Example 1

Preparation of Single-Phase Non-Aqueous Electrolyte and Evaluation of Separator Wettability A solvent mixture of EC, PC and the fluorine-substituted ether represented by the following Formula (i) was used as a non-aqueous solvent. As a lithium salt, $LiPF_6$ was used.

$$CF_3CFHCF_2CH(CH_3)OCF_2CFHCF_3 \qquad (i)$$

First, solvent mixtures were prepared by mixing EC and PC at ratios of 3:1, 2:2 and 1:3 (molar ratio) as shown in Table 1, and adding the fluorine-substituted ether (i) in an amount of 0.1 to 10 mol % relative to the whole amount of the obtained solvent mixture. The obtained solvent mixtures were all single-phase solutions.

Next, non-aqueous electrolytes of the present invention were prepared by dissolving 1 mol (151.9 g) of $LiPF_6$ in 1 liter of the solvent mixture. As can be seen from Table 1, when the amount of fluorine-substituted ether (i) was 10 mol %, and the molar ratio of EC and PC was 3:1 and 2:2, the resulting solutions separated into two phases. On the other hand, when the amount of fluorine-substituted ether (i) was 10 mol %, and the molar ratio of EC and PC was 1:3, the resulting solution was a single phase. It is clear from Table 1 that the amount of fluorine-substituted ether (i) is preferably 5 mol % or less so as to obtain a single-phase non-aqueous electrolyte using a non-aqueous solvent in which EC and PC exist at any ratio.

When it is necessary to obtain an electrolyte that does not solidify at low temperatures, it is preferable to increase the PC content.

Polyethylene separators were immersed in the obtained non-aqueous electrolytes as single phases, and the wettability was evaluated. As can be seen from Table 1, when the amount of fluorine-substituted ether (i) was 0.1 mol %, no separators were wet. As used herein, "a separator is wet" refers to a state that the non-aqueous electrolyte has permeated into the pores of the separator and the separator is translucent.

It is clear from Table 1 that the amount of fluorine-substituted ether (i) is preferably within a range from 1 to 5 mol % so as to prepare a single-phase non-aqueous electrolyte capable of wetting a polyethylene separator.

TABLE 1

| Fluorine-substituted ether (i) content | EC:PC (molar ratio) | | |
|---|---|---|---|
| (mol %) | 3:1 | 2:2 | 1:3 |
| 10 | Separate phases | Separate phases | Single phase/ Wet |
| 5 | Single phase/ Wet | Single phase/ Wet | Single phase/ Wet |
| 2 | Single phase/ Wet | Single phase/ Wet | Single phase/ Wet |
| 1 | Single phase/ Wet | Single phase/ Wet | Single phase/ Wet |
| 0.1 | Single phase/ Not wet | Single phase/ Not wet | Single phase/ Not wet |

Example 2

Assembly of Non-Aqueous Electrolyte Secondary Battery and Evaluation of Load Characteristics (1) Preparation of Non-Aqueous Electrolyte In the same manner as in EXAMPLE 1, non-aqueous electrolytes were prepared by mixing EC, PC and the fluorine-substituted ether represented by the above Formula (i) and dissolving 1 mol of $LiPF_6$ in 1 liter of the obtained solvent mixture. In Table 2, the value obtained by subtracting the mol % value of the fluorine-substituted ether (i) from 100 is the mol % value of the solvent mixture of EC and PC, and the ratios (molar ratios) at which EC and PC were mixed were as shown in Table 2.

(2) Production of Positive Electrode

A slurry of a positive electrode material mixture was prepared by mixing 93 parts by weight of $LiNi_{0.8}Co_{0.13}Al_{0.07}O_2$ powder (positive electrode active material), 3 parts by weight of acetylene black (conductive material) and 4 parts by weight of polyvinylidene fluoride (binder), and dispersing the resulting mixture in dehydrated N-methyl-2-pyrrolidone. The obtained slurry of the positive electrode material mixture was applied onto the surface of a 15 μm thick aluminum foil (positive electrode current collector), dried and rolled to form a 70 μm thick positive electrode active material layer, for obtaining a positive electrode sheet. The positive electrode sheet was cut into 35 mm×35 mm pieces serving as positive electrodes. Then, each piece was welded to an aluminum plate equipped with a positive electrode lead by ultrasonic welding.

(3) Production of Negative Electrode

A 300 μm thick lithium foil was cut into 35 mm×35 mm pieces serving as negative electrodes. Then, each piece was firmly attached to a copper plate equipped with a negative electrode lead.

(4) Production of Reference Electrode

A reference electrode was obtained by firmly attaching a 300 μm thick lithium foil to the tip of a 5 mm wide nickel lead.

(5) Assembly of Battery

An electrode assembly was produced by disposing a positive electrode and a negative electrode such that they faced each other with a polyethylene separator interposed therebetween, and integrating them through fixation of the aluminum plate and the copper plate with tape. Next, the obtained electrode assembly was housed together with the reference electrode in a tube-shaped aluminum laminate bag with both ends being open. The positive electrode lead and the negative electrode lead were drawn to the outside from the respective openings, and one opening of the aluminum laminate bag was sealed by fusing. Then, the non-aqueous electrolyte prepared above was dripped into the aluminum laminate bag through the other opening. The aluminum laminate bag was degassed at 10 mmHg for 5 seconds and, after that, the other opening was sealed by fusing. In this manner, a non-aqueous electrolyte secondary battery was assembled.

Each of the batteries obtained above was charged and discharged 5 times with a constant current of 4.5 mA at 20° C. The upper charge limit was set to a potential of the positive electrode of 4.3 V relative to that of the reference electrode. Likewise, the lower discharge limit was set to a potential of the positive electrode of 2.5 V relative to that of the reference electrode. The discharge capacity of the non-aqueous electrolyte secondary battery after 5 cycles was about 47 mAh.

(6) Evaluation of Load Characteristics for Non-Aqueous Electrolyte Secondary Battery At a temperature of 20° C., the battery was charged at a constant current of 4.5 mA until the potential of the positive electrode reached 4.3 V relative to that of the reference electrode. Next, at the same temperature of 20° C., the charged battery was discharged at a constant current of 9.4 mA until the potential of the positive electrode reached 2.5 V relative to that of the reference electrode. The discharge capacity obtained at this time is referred to as the "0.2 C capacity".

Subsequently, the battery was discharged at a constant current of 4.5 mA until the potential of the positive electrode reached 2.5 V relative to that of the reference electrode, and after that, the battery was charged at a constant current of 4.5 mA until the potential of the positive electrode reached 4.3 V relative to that of the reference electrode. The charged battery was then discharged at a constant current of 47 mA until the potential of the positive electrode reached 2.5 V relative to that of the reference electrode. The discharge capacity obtained at this time is referred to as the "1 C capacity". The load characteristics of the battery were calculated according to the following equation. A higher value of the load characteristics indicates far favorable lithium ion diffusion within the battery, more particularly, within the positive electrode. The results are shown in Table 2.

Load characteristics=1 C capacity/0.2 C capacity

TABLE 2

| Fluorine-substituted ether (i) content | Load Characteristics EC:PC (molar ratio) | | |
|---|---|---|---|
| (mol %) | 3:1 | 2:2 | 1:3 |
| 10 | — | — | 0.151 |
| 5 | — | — | 0.264 |
| 2 | 0.393 | — | — |
| 1 | 0.427 | 0.413 | 0.370 |
| 0.1 | — | 0.002 | — |

It can be seen from Table 2 that the load characteristics of the non-aqueous electrolyte secondary battery become far favorable as the amount of fluorine-substituted ether (i) is reduced. It can also be seen that the amount of fluorine-substituted ether (i) is preferably 5 mol % or less in the non-aqueous solvent, and more preferably 2 mol % or less. This is because that fluorine-substituted ether (i) poorly dissolves $LiPF_6$, so the degree of dissociation of $LiPF_6$ decreases and the resistance to lithium ion diffusion within the battery increases as the amount of the fluorine-substituted ether (i) increases in the non-aqueous solvent.

On the other hand, when the amount of the fluorine-substituted ether (i) is 0.1 mol % in the non-aqueous solvent, favorable load characteristics cannot be obtained. This is because when the amount of the fluorine-substituted ether (i) is small, the solvent mixture of EC and PC cannot wet a polyethylene separator, as already shown in EXAMPLE 1.

It is also clear from Table 2 that the load characteristics become greatly favorable as the EC molar ratio increases in the EC/PC molar ratio, and load characteristics of over 0.4 were obtained in the composition in which the EC molar ratio was greater than the PC molar ratio. This is because EC is smaller than PC in molecular volume, so as the number of molecules of EC that coordinate with a lithium ion increases, the first salvation shell including lithium ions becomes small and, as the result, the diffusion of lithium ions is facilitated.

Example 3 and Comparative Examples 1 to 2

Influence of Fluorine-Substituted Ether on Cycle Characteristics (1) Preparation of Non-Aqueous Electrolyte

Solvent mixtures were obtained by mixing EC, PC and one of the fluorine-substituted ethers represented by the following Formulas (i) to (iii) at the ratios (mol %) shown in Table 3. Then, non-aqueous electrolytes were prepared by dissolving 1 mol of $LiPF_6$ per 1 liter of the obtained solvent mixture. The following fluorine-substituted ethers were used.

$CF_3CFHCF_2CH(CH_3)OCF_2CFHCF_3$      (i)

$(CF_3)_2CFCF(OCH_3)CF_2CF_3$      (ii)

$CF_2HCF_2CH_2OCF_2H$      (iii)

(2) Assembly of Battery

In the same manner as in EXAMPLE 2, an electrode assembly was produced by disposing a positive electrode and a negative electrode such that they faced each other with a polyethylene separator interposed therebetween, and integrating them through fixation of an aluminum plate and a copper plate with tape. Next, in the same manner as in EXAMPLE 2, except that the reference electrode was not used, the obtained electrode assembly was housed in a tube-shaped aluminum laminate bag with both ends being open. The positive electrode lead and the negative electrode lead were drawn to the outside from the respective openings, and one opening of the aluminum laminate bag was sealed by fusing. Then, the non-aqueous electrolyte prepared above was dripped into the aluminum laminate bag through the other opening. The aluminum laminate bag was degassed at 10 mmHg for 5 seconds and, after that, the other opening was sealed by fusing. In this manner, a non-aqueous electrolyte secondary battery was assembled.

(3) Cycle Characteristics of Battery

The non-aqueous electrolyte secondary battery obtained above was repeatedly charged and discharged at a constant current of 9.4 mA at 20° C. The upper charge limit was set to a battery voltage of 4.3 V, and the lower discharge limit was set to a battery voltage of 2.5 V. The cycle characteristics were evaluated using the number of cycles at which the discharge capacity of the battery reached half the discharge capacity of the first cycle. The results are shown in Table 3.

TABLE 3

| | Content of each component of non-aqueous solvent | | | | |
|---|---|---|---|---|---|
| | EC | PC | Fluorine-substituted ether | | Cycle |
| | (mol %) | (mol %) | Formula | (mol %) | life |
| Ex. 3 | 74.25 | 24.75 | i | 1 | 198 |
| Comp. Ex. 1 | 74.25 | 24.75 | ii | 1 | 122 |
| Comp. Ex. 2 | 74.25 | 24.75 | iii | 1 | 105 |

It can be seen from Table 3 that the cycle characteristics of the battery are improved significantly by using the fluorine-substituted ether (i). This is presumably because the fluorine-substituted ether (i) contains a methyl group, so a vinyl ether group such as —CX=C(CH$_3$)—O— is readily produced, and a favorable film is formed on the negative electrode.

On the other hand, the cycle characteristics of the batteries of COMPARATIVE EXAMPLES 1 and 2 degraded significantly as compared to those of the battery of EXAMPLE 3. This is presumably because in the fluorine-substituted ether (ii) used in COMPARATIVE EXAMPLE 1, the amount of fluorine in one molecule was large, so fluorine reacted with the lithium contained in the negative electrode, producing a large amount of a lithium compound that would not dissolve in the non-aqueous electrolyte. Likewise, in the fluorine-substituted ether (iii) used in COMPARATIVE EXAMPLE 2, no methyl group exists in the molecule thereof, so a vinyl ether group was not readily produced, and the fluorine in the molecule reacted with the lithium contained in the negative electrode, as was the case with the fluorine-substituted ether (ii).

Example 4

Influence of Negative Electrode Active Material on Cycle Characteristics (1) Preparation of Non-Aqueous Electrolyte A solvent mixture was obtained by mixing EC, PC and the fluorine-substituted ether (i) at a ratio (mol %) shown in Table 4. Then, a non-aqueous electrolyte was prepared by dissolving 1 mol of $LiPF_6$ in 1 liter of the obtained solvent mixture.

(2) Production of Positive Electrode

A positive electrode sheet containing $LiNi_{0.8}Co_{0.13}Al_{0.07}O_2$ as a positive electrode active material was produced in the same manner as in EXAMPLE 2. The obtained positive electrode sheet was cut into a 35 mm×35 mm piece, and the resulting piece was welded to an aluminum plate equipped with a lead by ultrasonic welding to produce a positive electrode.

(3) Production of Negative Electrode

A slurry of a negative electrode material mixture was prepared by mixing 98 parts by weight of artificial graphite powder (negative electrode active material), 1 part by weight of modified styrene-butadiene latex (binder) and 1 part by weight of carboxymethyl cellulose (thickener), and dispersing the obtained mixture in water. The obtained slurry of a negative electrode material mixture was applied onto the surface of a 10 μm thick copper foil (negative electrode current collector), dried and rolled to form a 90 μm thick negative electrode active material layer on the surface of the copper foil, for obtaining a negative electrode sheet. The negative electrode sheet was cut into a 35 mm×35 mm piece, and the resulting piece was welded to a copper plate equipped with a lead by ultrasonic welding to produce a negative electrode.

(5) Assembly of Battery

A non-aqueous electrolyte secondary battery was produced in the same manner as in EXAMPLE 3, except that the positive electrode and negative electrode produced above were used. The obtained battery was repeatedly charged and discharged at a constant current of 4.5 mA at 20° C. The upper charge limit was set to a battery voltage of 4.2 V, and the lower discharge limit was set to a battery voltage of 2.5 V. The discharge capacity of the battery after 5 cycles was 46.1 mAh.

(6) Cycle Characteristics of Battery

The non-aqueous electrolyte secondary battery obtained above was repeatedly charged and discharged at a constant current of 23.5 mA at 20° C. The upper charge limit voltage and the lower discharge limit voltage were set to 4.2 V and 2.5 V, respectively. The cycle characteristics were evaluated using the number of cycles at which the discharge capacity of the battery reached half the discharge capacity of the first cycle. The results are shown in Table 4.

Example 5

A non-aqueous electrolyte secondary battery was produced in the same manner as in EXAMPLE 4, except that the following negative electrode was used. The obtained battery was repeatedly charged and discharged 5 times at a constant current of 4.5 mA at 20° C. The upper charge limit was set to a battery voltage of 4.2 V, and the lower discharge limit was set to a battery voltage of 2.0 V. The discharge capacity of the battery after 5 cycles was 46.4 mAh.

A negative electrode that contained a silicon oxide as a negative electrode active material was produced in the following manner. A $SiO_{0.56}$ thin film was formed on the surface of a surface-roughened copper foil (negative electrode current collector) by evaporating silicon in a chamber by electron beam deposition while introducing oxygen into the chamber. A cross section of this thin film was observed using a scanning electron microscope, and it was found that the thin film was an aggregation of silicon oxide pillars. Next, lithium in an amount corresponding to the irreversible capacity was evaporated onto the thin film. Specifically, lithium metal was evaporated in an amount of 0.2 lithium atoms relative to one silicon atom. The obtained negative electrode sheet was cut into a 35 mm×35 mm piece, and the resulting piece was welded to a copper plate equipped with a lead by ultrasonic welding to produce a negative electrode.

The non-aqueous electrolyte secondary battery obtained above was repeatedly charged and discharged at a constant current of 23.5 mA at 20° C. The upper charge limit and the lower discharge limit were set to 4.2 V and 2.0 V, respectively. The cycle characteristics were evaluated using the number of cycles at which the discharge capacity of the battery reached half the discharge capacity of the first cycle. The results are shown in Table 4.

Comparative Example 3

A non-aqueous electrolyte secondary battery was produced in the same manner as in EXAMPLE 5, except that fluorine-substituted ether (iii) was used instead of the fluorine-substituted ether (i). The battery was repeatedly charged and discharged at a constant current of 4.5 mA at 20° C. The upper charge limit was set to a battery voltage of 4.2 V, and the lower discharge limit was set to a battery voltage of 2.0 V. The discharge capacity of the battery after 5 cycles was 46.6 mAh.

The cycle characteristics of the non-aqueous electrolyte secondary battery were determined in the same manner as in EXAMPLE 5. The result is shown in Table 4.

TABLE 4

| | Content of each component of non-aqueous solvent | | | | Negative electrode active material | Cycle life |
|---|---|---|---|---|---|---|
| | EC (mol %) | PC (mol %) | Fluorine-substituted ether Formula | (mol %) | | |
| Ex. 4 | 59.4 | 39.6 | i | 1 | Artificial graphite | 257 |
| Ex. 5 | 59.4 | 39.6 | i | 1 | Silicon oxide | 361 |
| Comp. Ex. 3 | 59.4 | 39.6 | iii | 1 | Silicon oxide | 192 |

It can be seen from Table 4 that the battery of EXAMPLE 5 that includes a negative electrode containing a silicon oxide has a superior cycle characteristics to the battery of EXAMPLE 4 that includes a negative electrode containing artificial graphite. The reason for this is presumably as follows. In the negative electrode containing a silicon oxide, a lithium oxide film was formed on the surface of the negative electrode during the initial charge, so the reductive decomposition of the non-aqueous electrolyte was suppressed while the decomposition reaction of the fluorine-substituted ether proceeded gradually, as a result of which the lithium oxide film was maintained over a large number of cycles.

A comparison between the battery of EXAMPLE 5 including a silicon oxide-containing negative electrode and the battery of COMPARATIVE EXAMPLE 3 indicates that the addition of the fluorine-substituted ether (i) to a non-aqueous electrolyte can improve the cycle characteristics of the battery. Presumably, in the battery of EXAMPLE 5, because a vinyl ether group such as —CX=C(CH$_3$)—O— is readily produced owing to the presence of a methyl group in the fluorine-substituted ether, a favorable film is formed on the negative electrode, as a result of which the cycle characteristics is improved. On the other hand, in the battery of COMPARATIVE EXAMPLE 3, because no methyl group exists in the molecule thereof, a vinyl ether group is not readily produced, and the fluorine in the molecule reacts with the lithium contained in the negative electrode, as a result of which the cycle characteristics is reduced.

The non-aqueous electrolyte of the present invention is suitable for use in non-aqueous electrolyte secondary batteries, such as lithium ion batteries, required to have superior load characteristics and cycle characteristics.

The non-aqueous electrolyte secondary battery of the present invention can be used in the same applications as conventional non-aqueous electrolyte secondary batteries, and is particularly useful as a power source for a portable electronic device such as a personal computer, a cellular phone, a mobile device, a personal digital assistant (PDA), a camcorder or a portable game device. The non-aqueous electrolyte secondary battery of the present invention is also expected to be used as a secondary battery that assists in driving an electric motor in a hybrid electric vehicle, an electric vehicle, a fuel cell vehicle or the like; a power source for driving an electric tool, a cleaner, a robot or the like; or a power source for a plug-in HEV.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. A non-aqueous electrolyte comprising:
a non-aqueous solvent that primarily contains a solvent mixture of ethylene carbonate and propylene carbonate and includes a fluorine-substituted ether having a divalent group represented by Formula (1): —CFX—CH(CH$_3$)—O—, where X is a hydrogen atom or fluorine atom, in a molecule thereof; and
a lithium salt that is dissolved in said non-aqueous solvent,
wherein a total amount of the ethylene carbonate and the propylene carbonate in said non-aqueous solvent is 90 to 99.5 mol %, and
the ethylene carbonate content in the total amount of the ethylene carbonate and the propylene carbonate is 25 to 75 mol %.

2. The non-aqueous electrolyte in accordance with claim 1, wherein the content of said fluorine-substituted ether in said non-aqueous solvent is 0.5 to 10 mol %.

3. The non-aqueous electrolyte in accordance with claim 1, wherein the content of said fluorine-substituted ether in said non-aqueous solvent is 0.5 to 8 mol %.

4. A non-aqueous electrolyte secondary battery comprising:
a positive electrode containing a positive electrode active material;
a negative electrode containing a negative electrode active material; and
a non-aqueous electrolyte, said non-aqueous electrolyte comprising: a non-aqueous solvent that primarily contains a solvent mixture of ethylene carbonate and propylene carbonate and includes a fluorine-substituted ether having a divalent group represented by Formula (1): —CFX—CH(CH$_3$)—O—, where X is a hydrogen atom or fluorine atom, in a molecule thereof; and a lithium salt that is dissolved in said non-aqueous solvent,
wherein a total amount of the ethylene carbonate and the propylene carbonate in said non-aqueous solvent is 90 to 99.5 mol %, and
the ethylene carbonate content in the total amount of the ethylene carbonate and the propylene carbonate is 25 to 75 mol %.

5. The non-aqueous electrolyte secondary battery in accordance with claim wherein the content of said fluorine-substituted ether in said non-aqueous solvent is 0.5 to 10 mol %.

6. The non-aqueous electrolyte secondary battery in accordance with claim 4, wherein the content of said fluorine-substituted ether in said non-aqueous solvent is 0.5 to 8 mol %.

7. The non-aqueous electrolyte secondary battery in accordance with claim 4, wherein said negative electrode active material contains: an element capable of being electrochemically alloyed with lithium; and oxygen.

* * * * *